United States Patent [19]
Bishop et al.

[11] Patent Number: 4,609,718

[45] Date of Patent: Sep. 2, 1986

[54] ULTRAVIOLET CURABLE BUFFER COATINGS FOR OPTICAL GLASS FIBER BASED ON LONG CHAIN OXYALKYLENE DIAMINES

[75] Inventors: Timothy E. Bishop, Algonquin; Clive J. Coady, Hanover Park; John M. Zimmerman, Schaumburg, all of Ill.

[73] Assignee: DeSoto, Inc., Des Plaines, Ill.

[21] Appl. No.: 731,887

[22] Filed: May 8, 1985

[51] Int. Cl.$^4$ .............................................. C08G 18/30
[52] U.S. Cl. ...................................... 528/49; 526/301; 560/25; 560/125; 560/158
[58] Field of Search ........................... 528/49; 526/301; 560/25, 125, 158

[56] References Cited

U.S. PATENT DOCUMENTS

| | | | |
|---|---|---|---|
| 4,097,439 | 6/1978 | Darling | 260/31.2 N |
| 4,198,200 | 4/1980 | Fonda et al. | 525/440 |
| 4,246,379 | 1/1981 | Howard | 525/440 |
| 4,254,230 | 3/1981 | Howard | 525/28 |

*Primary Examiner*—Maurice J. Welsh
*Attorney, Agent, or Firm*—Dressler, Goldsmith, Shore, Sutker & Milnamow, Ltd.

[57] ABSTRACT

An ultraviolet curing liquid coating composition is provided which, when cured with ultraviolet light in the presence of an appropriate photoinitiator, provides a buffer coating for optical glass fiber having adequate strength at room or expected elevated temperature and stability at such elevated temperature, a high index of refraction above 1.48, and a low tensile modulus which remains low to resist microbending difficulties down to around $-60°$ C. This coating composition consists essentially of a linear acrylate-terminated polyurethane oligomer including urea groups introduced by the presence in the oligomer of the reaction product with isocyanate functionality of about 30% to about 90% by weight of the acrylate-terminated oligomer of a polyoxyalkylene diamine having a molecular weight in the range of from about 1000 to about 8000 in which the alkylene group contains from 2–4 carbon atoms.

19 Claims, No Drawings

ULTRAVIOLET CURABLE BUFFER COATINGS FOR OPTICAL GLASS FIBER BASED ON LONG CHAIN OXYALKYLENE DIAMINES

DESCRIPTION

1. Technical Field

This invention relates to ultraviolet curable coatings intended to be applied directly to the surface of optical glass fiber to protect the same, these coatings providing low tensile modulus at low service temperature so as to resist microbending. Coatings of this character are sometimes too soft to be used along, so they are normally overcoated with a harder and stronger coating to better resist the stresses which are expected to be encountered.

2. Background Art

Optical glass fiber must be coated to protect its surface against abrasion, and normal heat-cured coatings are slow curing, so it has been desired to employ ultraviolet-curing coating compositions. This proved to be quite difficult in practice because the optical fiber must be expected to encounter a wide range of service temperatures, including very low service temperatures. The usual ultraviolet-cured coatings are too hard when first used or become too hard when subjected to these low service temperatures. This excessive hardness causes the difference between the thermal coefficient of expansion of the coating and the thermal coefficient of expansion of the glass to produce microbends in the fiber which interfere with the capacity of the fiber to convey optical messages.

Industry experienced great difficulty in providing ultraviolet curing coatings which would protect the glass surface against mechanical stress without inducing microbending difficulties at low service temperatues until our coworker, R. E. Ansel in application Ser. No. 170,148 filed July 18, 1980 found that certain urethane oligomer diacrylates could be combined with appropriate mixtures of monoethylenically unsaturated monomers including a large proportion of a monomer of low glass transition temperature to provide a primer or buffer coating which could then be overcoated with a stronger and harder topcoat to provide the combination of properties which was needed. However, a small proportion of a hydrogen bonding monomer was needed to obtain adequate strength at room and elevated temperatures, and this led to high modulus at very low temperatures.

Another problem is the desire to employ coatings of high refractive index above 1.48. The optical fiber industry prefers to employ coatings of high refractive index because there is reason to believe the higher index of refraction will cause less attenuation in the light passing through the fiber. The coatings provided in the aforesaid Ansel application provide ultraviolet-cured coatings having the desired high refractive index, and this is an advantage of those coatings.

Unfortunately, the coatings disclosed in the aforesaid Ansel application are only able to resist temperatures down to around $-40°$ C., and in some instances it is desired to extend the service temperature down to around $-60°$ C. While some ultraviolet curing coatings have been found to possess the desired low tensile modulus at low temperature required to resist microbending at $-60°$ C., some of these possess a refractive index below 1.48, and are less desirable for this reason.

One cannot merely select very soft coatings because most of these have very poor properties at room or higher temperatures, or have poor heat stability. Optical fibers will not only encounter low service temperatures from time to time, but they will also encounter elevated service temperatures. The buffer coatings must retain some minimal strength at these elevated temperatures, and they must be stable at elevated temperature so as not to acquire greater hardness which induces microbending when low temperatures are subsequently encountered.

This invention intends to provide ultraviolet curing coating compositions which cure to provide buffer coatings for optical glass fibers which exhibit a combination of low tensile modulus which is maintained low at low temperature, high refractive index above 1.48, and reasonable resistance to elevated temperature combined with good stability at such elevated temperature.

DISCLOSURE OF INVENTION

In accordance with this invention, an ultraviolet curing liquid coating composition which, when cured with ultraviolet light in the presence of an appropriate photoinitiator, provides a buffer coating for optical glass fiber having adequate strength at room or expected elevated temperature and stability at such elevated temperature, a high index of refraction above 1.48, and a low tensile modulus which remains low to resist microbending difficulties down to around $-60°$ C. This coating composition consists essentially of a linear acrylate-terminated polyurethane oligomer including urea groups introduced by the presence in the oligomer of the reaction product with isocyanate functionality of about 30% to about 90% by weight of the acrylate-terminated oligomer of a polyoxyalkylene diamine having a molecular weight in the range of from about 1000 to about 8000 in which the alkylene group contains from 2-4 carbon atoms. The polyoxyalkylene diamine preferably has a molecular weight of from 1500 to 5000.

To more fully characterize the cured coatings in this invention, they possess a minimal acceptable tensile modulus at room temperature (25° C.) of at least about 100 psi., preferably at least 200 psi. At the same time, they provide a maximum tensile modulus at $-60°$ C. of less than 175,000 psi., preferably less than 100,000. These characteristics are measured on a three mil film of cured oligomer.

These acrylate-terminated polyurethane oligomers are useful alone in some instances, when the oligomer is itself liquid, but in other instances, the oligomer is solid or unduly viscous, in which case it is used in admixture with a liquid acrylate-functional material which does not increase the low temperature hardness and which provides the liquidity needed for coating application. This acrylate-functional liquid may be a monoacrylate monomer having a glass transition temperature below about 0° C. (preferably below $-20°$ C.) which provides the coating composition with a viscosity suitable for coating, or it may be a linear aliphatic diacrylate in which the two acrylate groups are separated by a chain of at least 6 carbon atoms or by a molecular weight of at least 400 up to about 4000.

Referring more particularly to the linear acrylate-terminated polyurethane oligomer which includes urea groups introduced by the inclusion of a polyoxyalkylene diamine having a molecular weight in the range of from about 1000 to about 8000, this long chain diamine will constitute from about 30% to about 90% of the weight of the acrylate-terminated oligomer, preferably from 45% to 80% thereof. This diamine will be incorporated into the oligomer by reaction with one isocyanate group of an organic diisocyanate which forms a urea linkage and which provides a free isocyanate group which can be used for further oligomer growth or which can be directly capped by reaction with a monohydric acrylate or polyacrylate. The acrylate-terminated polyurethane oligomer may contain from 2 to about 10 urethane groups per molecule, and from 2 to about 6 urea groups. The number of groups will depend upon the molecular weight, and this can range from about 2000 to about 10000, preferably from 2,500 to 6000.

To more fully consider the long chain polyoxyalkylene diamines used herein, the alkylene group is to have from 2-4 carbon atoms and there must be enough oxyalkylene groups to provide the required molecular weight. While polyoxyethylene and polyoxybutylene groups are useful herein, the polyoxybutylene species is less available, and the polyoxypropylene species produces distinctly superior results in comparison with the polyoxyethylene species, so polyoxypropylene diamines are particularly preferred.

Polyoxyalkylene diamines have previously been used in acrylate-terminated polyurethane oligomers used in ultraviolet-cured buffer coatings for optical fibers. The urea groups so-introduced conferred superior room temperature strength. However, the previously used diamines were of low molecular weight, e.g., from about 200 to about 600. This provided improved room temperature strength, but it did not simultaneously improve the low temperature tensile modulus.

It should be observed that the harder and stronger the coating is at room temperature, the harder and stiffer the coating usually is at −60° C. Under normal circumstances, when one gains strength at room temperature, one loses low temperature microbending resistance, so one in effect trades off one set of properties against another because the ratio of room temperature modulus to the modulus at −60° C. is about 350 or greater. In the prior Ansel compositions, this ratio is typically about 580 provided by a room temperature modulus of 500 psi and a −60° C. modulus of 290,000. In this invention, this ratio is less than about 325, and is preferably less than 250, the use of the long chain diamines in this invention providing this uniquely superior balancing of properties.

Any organic diisocyanate can be used to form the acrylate-terminated oligomers, such as 2,4-toluene diisocyane, isophorone diisocyante, 4,4′diphenylmethane diisocyanate, methylenebis (4-cyclohexyl-isocyanate), and the like.

In some instances it is preferred to use a diisocyanate in which a linear aliphatic chain containing at least 6 carbon atoms separates the two isocyanate groups. Any long chain aliphatic diisocyanate can be used, such as trimethyl hexamethylene diisocyanate or 1, 12-dodecyl diisocyanate. The preferred diisocyanates are dimer fatty acid diisocyanates. Dimer fatty acids are dicarboxylic acids formed by dimerizing fatty acids which usually contain 18 carbon atoms, and this provides a 36 carbon atom dicarboxylic acid. When these two terminal carboxylic acid groups are converted to isocyanate groups, the result is a $C_{36}$ diisocyanate.

The separation of the two isocyanate groups may include other groups in addition to the long carbon chain. Thus, dimer fatty acids may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion, and the resulting diamine can be reacted with excess diisocyanate to provide a diisocyanate which still contains the 36 carbon atoms chain which has been found to provide the new properties desired herein.

In this invention, it is preferred to have the acrylate-terminated oligomer include only three components, namely: the polyoxyalkylene diamine; the organic diisocyanate; and the monohydric mono- or polyacrylate. However, other difunctional components which are reactive with the primary amine groups in the diamine or with the isocyanate groups of the diisocyanate may also be present, especially when they constitute less than 25% of the weight of the oligomer. These are illustrated by diols, such as 1,6-hexane diol, polypropylene glycol having a molecular weight of 400, or even polyesters illustrated by polycaprolactone glycols, lower molecular weight diamines, such as a polyoxypropylene diamine having a molecular weight of 230 or 400, or an amino alcohol, such as glycine.

The molecular weights herein are calculated from the reactivity of the compounds based on their theoretical formulas.

In the production of the acrylated oligomers of this invention, the polyurethane or polyurea diisocyanate is half end capped with a monohydric acrylate or polyacrylate. 2-hydroxyethyl acrylate is a preferred monohydric monoacrylate. Polyacrylates help to speed the cure at little sacrifice of low temperature softness, and are preferred for that purpose. These are illustrated by pentaerythritol triacrylate. Other monohydric polyacrylates which may be used are illustrated by glycerin diacrylate, trimethylol propane diacrylate, the dimer of pentaerythritol triacrylate having a single hydroxy group, and the diacrylate of propoxylated trimethylol propane having a molecular weight of about 675 (calculated from the hydroxyl equivalent weight determined by infrared spectrometry). All of these will considerably speed the ultraviolet cure, but they will not unduly increase the tensile modulus at temperatures of −40° C. down to −60° C.

In preferred practice, a half end capped diisocyanate is reacted with the other difunctional reactants, particularly with the amine-terminated oligomer which may consist of the long chain polyoxyalkylene diamine. Sufficient difunctional reactants are used to consume all of the isocyanate functionality.

The sequence of reactions is of secondary significance, for end capping can precede, follow or be simultaneous with the reaction with the diamine. As is well known, the diamine will form two urea groups, one from each of the two amine groups, to chain extend the half end capped diisocyanate (which is an unsaturated monoisocyanate).

The liquid monoacrylate monomer having a low glass transition temperature is used to provide softness and also to modify the normally solid diacrylate polyurethane polyurea to provide the coating composition with an appropriate coating viscosity. In this invention it is found that the acrylate-terminated polyurethane polyureas, either along or in combination with low glass transition temperature monomer cure, on ultraviolet exposure in the presence of appropriate photoinitiators, to provide soft coatings which retain low modulus down to very low temperature. Moreover, the modulus ratio discussed previously can be very favorable, allowing the combination of good room temperature strength with good low temperature resistance to microbending.

The hydrogen bonding monomers, such as N-vinyl pyrrolidone, are no longer essential, though they can be used to increase strength when it is desired to combine reasonable low temperature resistance to microbending with superior room temperature hardness enabling the usual topcoat to be eliminated. Thus, it is possible to include, especially when the coating is to be used as a single coating without any topcoat, up to about 15% of a liquid monomer having a high glass transition temperature, preferably above about 55° C. These are illustrated by dimethyl acrylamide, isobornyl acrylate, acrylic acid and dicyclopentenyl acrylate, in addition to the N-vinyl pyrrolidone which is preferred for this restricted purpose. Topcoat application of the coatings of this invention are also contemplated, and when these are intended, the high glass transition temperature monomers just illustrated would be used in an amount of from about 15% to about 45%.

Good resistance to low temperature microbending can also be introduced by including in the liquid mixture applied to the glass filament, a relatively high molecular weight liquid linear aliphatic diacrylate in which the two acrylate groups are separated by a linear chain containing at least 6 carbon atoms, or where less than 6 carbon atoms are present in the chain, that chain has a molecular weight of from 400 to about 4000, preferably from 600 to 2500. Polyoxyalkylene glycol diacrylates are preferred especially polyoxybutylene glycol diacrylates having a molecular weight of from 800 to 2000. These linear diacrylates are preferably used together with the acrylate-terminated oligomers containing a long chain diisocyanate, as previously disclosed.

Commercially available products which may be used as the liquid linear aliphatic diacrylate component are Chemlink products 9000 and 9001, as well as Chemlink 2000. These Chemlink products are supplied by Sartomer Company, a division of Atlantic Richfield, Westchester, Pa.

The glass transition temperature of the monomer is the glass transition temperature of a homopolymer of the monomer, and this is a conventional identification of the character of a monomer. Suitable low glass transition temperature monomers are illustrated by ethoxyethoxyethyl acrylate, phenoxyethyl acrylate, butoxyethyl acrylate, 2-hydroxyethyl acrylate, and the like. Ethoxyethoxyethyl acrylate is preferred, as will be illustrated in the Example.

The cured compositions of this invention normally have an index of refraction of about 1.54–1.55, and posses a tensile modulus which is far lower than was previously obtainable using the teachings of the referred to Ansel application. As a result, microbending difficulties are now avoidable down to around −60° C.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. The preferred photoinitiator is 2,2-dimethoxy 2-phenyl acetophenone which is available in commerce under the trade designation Irgacure 651. These photoinitiators are used alone or in admixture with one another, and amines, like diethyl amine, can be added as photosensitizer, though this is not normally needed.

The coating compositions of this invention are normally free of volatile organic solvents because these would have to be evaporated prior to ultraviolet exposure, which would slow the curing system.

EXAMPLE 24.44 parts of dimer $C_{36}$ fatty acid diisocyanate (Henkel Corporation, Minneapolis, Minn. product DDI 1410 may be used), 0.05 part of dibutyl tin dilaurate are charged to a reactor where they are blanketed with nitrogen gas and stirred while heating to 60° C. There is then added to the reactor at 60° C. over a 20–30 minute period, 40.74 parts of polyoxyethylene diamine having a molecular weight of 2000 (Jeffamine ED 2001 from Texaco Inc. Houston, Tex., may be used). This mixture contains 2 moles of diisocyanate per mole of the diamine and is stirred for an additional ½ hour to complete the reaction between the amine and isocyanate functionalities. 20 parts of butoxyethyl acrylate are then added over a 20 minute period to reduce the viscosity with a monomer having a low glass transition temperature. 14.72 parts of the 2-hydroxyethyl acrylate monoester with dicaprolactone in admixture with 0.05 part of 3,5-ditertiary butyl 4-hydroxy toluene are then added over a 20 minute period and stirring is continued for an additional hour to end cap the diisocyanate-terminated polyurethane which is present. The result is a diacrylate-functional polyurethane ployurea oligomer.

The above product is mixed with 3% by weight of 2,2-dimethoxy 2-phenyl acetophenone and coated upon glass to form a film 3 mil thick which is cured by exposure to ultraviolet light using medium pressure mercury vapor lamps which supply ultraviolet light having a wavelength ranging from about 260 to about 380 nanometers. The ultraviolet dose is about 3.5 Joules/cm$^2$.

The cured films are then stripped from the glass support and tested to show a tensile strength at 25° C. of 102 psi. (the tensile modulus is 389 psi.) and an elongation of 93%. At −60° C. the tensile strength was 3865 psi. (the tensile modulus is 107,860 psi.) and the elongation was 89%. These properties are reasonably effective in avoiding microbending difficulties at −60° C. while the room temperature properties provide acceptable strength. The compositions are stable at 130° F.

The modulus referred to herein is tensile modulus, and it is measured at 2½ % elongation.

EXAMPLE 2

Another acrylate-terminated oligomer is provided by first reacting isophorone diisocyanate with 2-hydroxyethyl acrylate to form a monoisocyanate containing a single acrylate group. 25.8 parts of this monoisocyanate is reacted with 74.1 parts of polyoxypropylene diamine having a molecular weight of 2000 (Jeffamine D 2000 from Texaco Inc. Houston, Tex., may be used). The resulting acrylated oligomer contains 0.11 part of phenothiazine for stability. The product is a liquid which is used without addition of liquid monomer or the like.

Upon applying a mixture of 97 parts of the above oligomer in admixture with 3 parts of 2,2-dimethoxy 2-phenyl acetophenone and curing as in Example 1, the cured films exhibit a tensile strength at 25° C. of 325 psi. (the tensile modulus is 507 psi.) and an elongation of 94%. At −60° C. the tensile strength was 3918 psi. (the tensile modulus is 60,315 psi.) and the elongation was 61%. These properties are reasonably effective in avoiding microbending difficulties at −60° C. while the room temperature properties provide acceptable strength. The compositions are stable at 130° F.

EXAMPLE 3

Repeating Example 2 with 56.64 parts of the same diamine, and using a monoisocyanate made by reacting 35.63 parts of the diisocyanate used in Example 1 with 7.58 parts of 2-hydroxyethyl acrylate in the presence of 0.1 part of dibutyl tin dilaurate, provides another acrylated oligomer which is stabilized with 0.049 part of phenothiazine. 67 parts of this oligomer are mixed with 30 parts of polyoxybutylene diacrylate having a molecular of 774 and 3.0 parts of 2,2-dimethoxy 2-phenyl acetophenone and cured as in Example 1. The cured films exhibit a tensile strength at 25° C. of 189 psi. (the tensile modulus is 245 psi.) and an elongation of 61%. At −60° C. the tensile strength was 3100 psi. (the tensile modulus is 47,900 psi.) and the elongation was 58%. These properties are reasonably effective in avoiding microbending difficulties at −60° C. while the room temperature properties provide acceptable strength. The compositions are stable at 130° F.

EXAMPLE 4

77 parts of the acrylated oligomer of Example 3 are mixed with 20 parts of butoxyethyl acrylate and 3.0 parts of 2,2-dimethoxy 2-phenyl acetophenone and cured as in Example 1. The cured films exhibit a tensile strength at 25° C. of 66 psi. (the tensile modulus is 138 psi.) and an elongation of 73%. At −60° C. the tensile strength was 1836 psi. (the tensile modulus is 43,867 psi.) and the elongation was 16%. These properties are reasonably effective in avoiding microbending difficulties at −60° C. while the room temperature properties provide acceptable strength. The compositions are stable at 130° F.

In contrast with the results reported above, a typical commercial composition in accordance with the disclosure of said application Ser. No. 170,148 coated and cured in the same way provides a film having a 25° C. strength of 500 psi, a tensile modulus of 500 psi., and an elongation of 170%. At −60° C., the tensile strength increased to 8700 psi., the modulus increased to 290,000 psi., and the elongation was only 5%. Thus, these cured coatings at −60° C. are much harder and more brittle than those obtained herein. All of these coatings have about the same desirable refractive index of about 1.54.

It should be observed that the ratio of modulus at −60° C. to modulus at room temperature has been very considerably changed. In the typical commerical composition, this ratio is 290,000 divided by 500 (about 580). In contrast, Example 1 using the polyoxyethylene diamine provided a ratio of 389 which, though far better than the commercial control, is not as good as this invention allows. Example 4 provided a somewhat better ratio of 318 through the use of polyoxypropylene diamine in combination with a low glass transition temperature acrylate monomer. Example 3 is similar to example 4, but the low glass transition temperature acrylate monomer is replaced by a long chain diacrylate, and this provided a much better ratio of 195. With this ratio, a room temperature modulus of 245 is combined with a −60° C. modulus of 47,900, and this is quite favorable. The best ratio was obtained in Example 2 (119) which employs the largest proportion of polyoxypropylene diamine in the absence of any additional liquid. This allows one to combine a room temperature modulus of 507 (about the same as the commerical control) with a −60° C. modulus of 60,315 which is less than one fourth the low temperature modulus of the commercial control.

The coatings of this invention are applied to freshly drawn optical glass fiber having a diameter of about 125 microns in a thickness of about 125 microns and are cured by passing the coated fiber through two tandemly arranged 10 inch 300 watts medium pressure vapor lamp at 1.5 meters per second.

What is claimed is:

1. An ultraviolet curing liquid coating composition which, when cured with ultraviolet light in the presence of an appropriate photoinitiator, provides a buffer coating for optical glass fiber having adequate strength at room or expected elevated temperature and stability at such elevated temperature, a high index of refraction above 1.48, and a low tensile modulus which remains low to resist microbending difficulties down to around −60° C., said coating composition consisting essentially of a linear acrylate-terminated polyurethane oligomer including urea groups introduced by the presence in the oligomer of the reaction product with isocyanate functionality of about 30% to about 90% by weight of the acrylate-terminated oligomer of a polyoxyalkylene diamine having a molecular weight in the range of from about 1000 to about 8000 in which the alkylene group contains from 2–4 carbon atoms.

2. An ultraviolet curing liquid coating composition as recited in claim 1 in which said acrylate-terminated polyurethane oligomer has a molecular weight in the range from about 2000 to about 10000, and the cured coatings posses a minimal tensile modulus at 25° C. of at least about 100 psi. and a maximum tensile modulus at −60° C. of less than 175,000 psi.

3. An ultraviolet curing liquid coating composition as recited in claim 2 in which said diamine has a molecular weight of from 1500 to 5000.

4. An ultraviolet curing liquid coating composition as recited in claim 3 in which said diamine is a polyoxypropylene diamine.

5. An ultraviolet curing liquid coating composition as recited in claim 1 in which said acrylate-terminate polyurethane oligomer is used in admixture with an acrylate-functional liquid which does not increase the low temperature hardness and which provides the liquidity needed for coating application.

6. An ultraviolet curing liquid coating composition as recited in claim 5 in which said acrylate-functional liquid is a monoacrylate monomer having a glass transition temperature below about 0° C. which provides the composition with a viscosity suitable for coating.

7. An ultraviolet curing liquid coating composition as recited in claim 6 in which said monoacrylate monomer has a glass transition temperature below about −20° C.

8. An ultraviolet curing liquid coating composition as recited in claim 7 in which said low glass transition temperature monomer is selected from the group consisting of ethoxyethoxyethyl acrylate, phenoxyethyl acrylate, butoxyethyl acrylate, and 2-hydroxyethyl acrylate.

9. An ultraviolet curing liquid coating composition as recited in claim 1 in which said acrylate-terminated polyurethane oligomer is used in admixture with a linear aliphatic diacrylate in which the two acrylate groups are separated by a chain of at least 6 carbon atoms or by a molecular weight of at least 400 up to about 4000.

10. An ultraviolet curing liquid coating composition as recited in claim 1 in which said diamine is present in said acrylate-terminated polyurethane oligomer in an amount of from 45% to 80%.

11. An ultraviolet curing liquid coating composition as recited in claim 1 in which said acrylate-terminated polyurethane oligomer has a molecular weight of from about 2500 to about 6000, and contains from 2 to about 10 urethane groups per molecule and from 2 to about 6 urea groups.

12. An ultraviolet curing liquid coating composition as recited in claim 1 in which said acrylate-terminate polyurethane oligomer is based on a diisocyanate in which a linear aliphatic chain containing at least 6 carbon atoms separates the two isocyanate groups.

13. An ultraviolet curing liquid coating composition as recited in claim 12 in which said diisocyanate is provided by dimer fatty acid diisocyanate.

14. An ultraviolet curing liquid coating composition as recited in claim 13 in which said dimer fatty acid diisocyanate contains 36 carbon atoms.

15. An ultraviolet curing liquid coating composition as recited in claim 2 in which said coating composition cures to provide an index of refraction is about 1.54–1.55.

16. An ultraviolet curing liquid coating composition as recited in claim 1 in which said oligomer is capped with a monohydric mono- or polyacrylate.

17. An ultraviolet curing liquid coating composition as recited in claim 1 in which said acrylate-terminated polyurethane oligomer is a liquid present in the substantial absence of other liquids.

18. An optical glass fiber coated with an ultraviolet-cured coating of the composition of claim 1.

19. An optical glass fiber coated with an ultraviolet-cured coating of the composition of claim 17.

* * * * *